May 7, 1968 — P. R. FRYMARK — 3,381,700

HOUSEHOLD WASHING APPLIANCE

Filed Nov. 2, 1965

INVENTOR
Per Roland Frymark
BY
ATTORNEY

United States Patent Office 3,381,700
Patented May 7, 1968

3,381,700
HOUSEHOLD WASHING APPLIANCE
Per Roland Frymark, Huddinge, Sweden, assignor to Aktiebolaget Electrolux, Stockholm, Sweden, a corporation of Sweden
Filed Nov. 2, 1965, Ser. No. 506,060
Claims priority, application Sweden, Nov. 3, 1964, 13,241/64
10 Claims. (Cl. 137—216)

My invention relates to household washing appliances, and it is an object of the invention to provide an improved assembly for such an appliance to which the liquid connections can be made and which is readily removable to facilitate inspection and repair of a washing appliance without disconnecting the liquid connections therefrom.

Another object of my invention is to provide such an assembly having a panel which is removably mounted on the washing appliance and easily accessible and to which the liquid supply and discharge connections can be made and also provides a vacuum breaker as a unitary part thereof.

A further object of my invention is to provide such an assembly which also embodies several protective features including an alternative path of flow for liquid to the inlet of a drain pump when the primary liquid supply line to the appliance cannot function to handle all of the liquid being introduced to the appliance.

A still further object of my invention is to provide a further protective feature which coacts with the alternative path of flow of liquid to the suction inlet of the drain pump and is rendered operable to allow liquid to flow exteriorly of the appliance when the drain pump becomes inoperable to drain liquid from the appliance, thereby avoiding flooding of the appliance.

Further objects and advantages of the invention will become apparent as the description proceeds, and the features of novelty which characterize the invention will be pointed out with particularity in the claims annexed to and forming a part of this specification.

Figure 1:
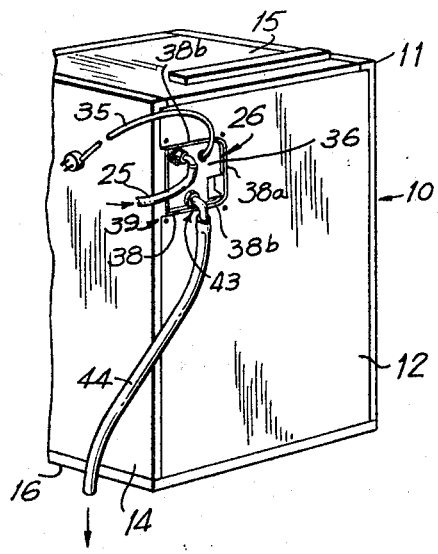
Figure 2:
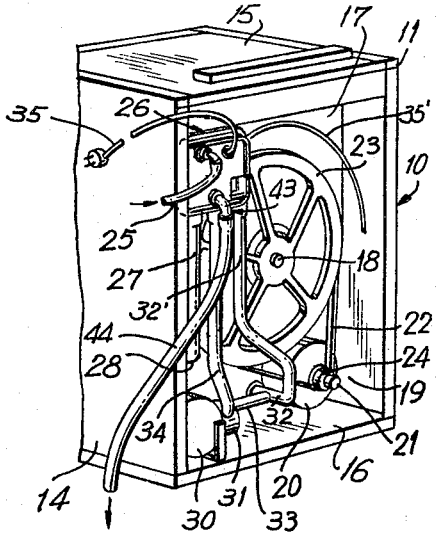
Figure 3:
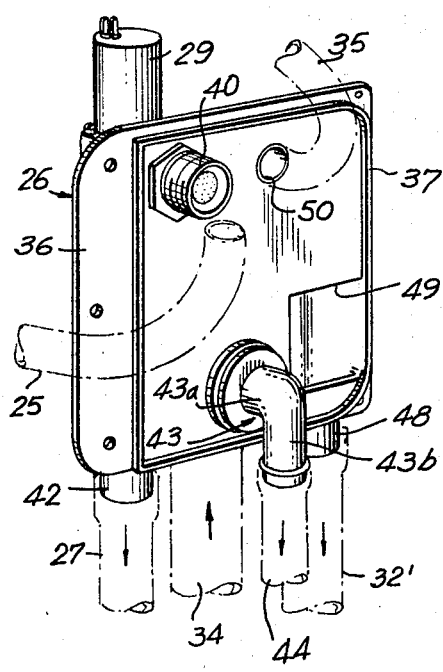
Figure 4:
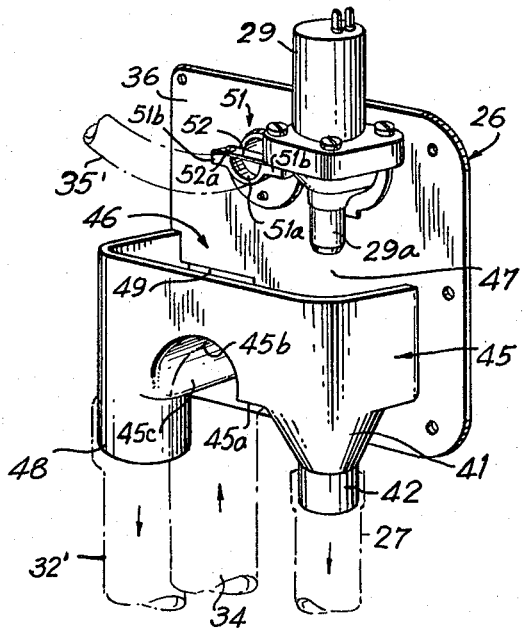

In the drawing, FIG. 1 is a fragmentary rear perspective view of a washing machine embodying my invention; FIG. 2 is a fragmentary view similar to FIG. 1, the rear wall being removed to illustrate details; FIG. 3 is an enlarged exterior perspective view of an assembly shown in FIGS. 1 and 2 to which are connected conduits for supplying and discharging liquid to and from the washing machine; and FIG. 4 is a inner perspective view of the assembly shown in FIG. 3.

Referring to FIGS. 1 and 2 I have shown my invention embodied in a washing machine 10 having an outer shell 11 including a front wall (not shown), a removable rear wall 12, spaced lateral walls 14, and top and bottom walls 15 and 16, respectively. Within the outer shell 11 is disposed a washing receptacle 17 having therein a rotatable perforated cylinder (not shown) provided with a horizontally extending stub shaft 18 and to which access may be had in any well known manner by the top wall 15 which may be hinged (not shown) to the outer shell 11.

The shaft 18 is journaled for rotation in any suitable manner and extends rearward from the receptacle 17 into a compartment 19 at the rear of the outer shell 11. The shaft 18 is driven by an electric motor 20 which is mounted in the bottom of the compartment 19 and provided with a shaft 21. An endless belt 22 which is disposed about pulleys 23 and 24 fixed to the shafts 18 and 21 respectively, forms a part of the mechanism to render the motor 20 operable to rotate the perforated drum within the washing receptacle 17.

During a sequence of operations of the washing machine 10, liquid is introduced into the receptacle 17 from a suitable source of supply through a flexible conduit 25, and assembly 26 to be described hereinafter, and a flexible conduit 27 which extends vertically downward from the assembly 26 and is connected at 28 to the receptacle at a level above the bottom of the receptacle. The washing machine may be provided with a suitable control device (not shown) having electrical and mechanical components for controlling the supply of liquid to the receptacle 17 through a solenoid operated valve 29 which is closed by a suitable sensing device in any well known manner when the liquid reaches the desired level in the receptacle 17. When this occurs, the control device may be arranged to energize the motor 20 to drive the rotatable drum within the receptacle 17.

After a suitable interval of time, the control device may function to deenergize and stop the motor 20 and thereafter energize an electric motor 30 arranged to operate a drain pump 31 having an inlet connected to receive liquid through conduits 32 and 33 from the bottom of the receptacle 17. Conduit 32 also includes a flexible section 32' which extends vertically upward from the bottom of the receptacle 17 to the assembly 26 for a purpose that will be described presently. Liquid received by the pump 31 is discharged from its outlet through a flexible conduit 34 which extends vertically upward therefrom to the assembly 26. The control device may be arranged to deenergize the motor 30 and stop the drain pump 31 when all of the liquid has been discharged from the receptacle 17.

The electrical components of the control device are connected to receive electrical energy from a suitable source of electrical supply through an electrical cord 35 which is fixed to the assembly 26 and includes a section 35' arranged in any suitable manner (not shown) to supply electrical energy to the solenoid operated valve 29 and electric motors 20 and 30 responsive to the operation of the control device. The foregoing sequence of operations may be repeated several times to provide at least one washing period and one or more rinsing periods. Finally, the perforated cylinder within the receptacle 17 may be driven by the motor 20 to extract liquid by centrifugal force from the clothes being washed such water extracted from the clothes may be removed from the bottom of the receptacle 17 by energizing the drain motor 30 and rendering the drain pump 31 operable to raise liquid through the conduit 34 to the assembly 26.

In accordance with my invention, I provide the assembly 26 which is removably mounted on the rear wall 12 of the washing machine 10 and to which the liquid and electrical connections described above are made to facilitate inspection and repairing of the different working parts of the washing machine 10 without disconnecting the electrical connections and liquid supply and discharge conduits.

As shown in FIG. 3, the assembly 26 comprises a panel 36 of rectangular shape having a flange 37 at the outer face or exterior surface thereof. The rear wall 12 of the washing machine 10 is formed with a U-shaped opening 38 having a closed end 38a and spaced horizontal sides 38b extending from the closed end 38a toward a lateral side wall 14 of the outer shell 11. The panel 36 may be moved through the opening 38 to position and locate the flange 37 at the edges of the opening 38. The panel 36 may be removably connected to the rear panel 12 at 39, as by screws, for example. The solenoid operated valve 29 is fixed to the inner face or side of the panel at an opening formed therein and from which a nipple 40 projects forward from the exterior face or surface of the panel 36, as best shown in FIG. 3. The flexible conduit 25, through which liquid is conducted from a suitable source of supply, is connected to the nipple 40.

The solenoid operated valve 29 is formed with a downward directed nozzle 29a from which liquid is discharged into a funnel 41 having a tubular fitting 42 at its lower end to which is connected the upper end of the flexible conduit 27. The panel 36 also is formed with an opening to which is connected a horizointal arm 43a of an L-shaped fitting 43, the other arm 43b of which depends vertically downward therefrom. The upper end of the flexible conduit 34, through which liquid is discharged from the receptacle 17 by the drain pump 31, is connected in any suitable manner to the panel 36 at an opening therein which communicates with the L-shaped fitting 43. A flexible conduit 44 is connected to the vertical arm 43b of the L-shaped fitting 43 for conducting to waste liquid drained by the pump 31 from the bottom of the receptacle 17.

As best shown in FIG. 4, it will be seen that the funnel 41 depends downward from the bottom 45a of a three-sided member 45 which is open at the top and the sides of which are secured to the inner face or side of the panel 36 to form a trough 46. In FIG. 4 it will be observed that there is an air gap 47 between the nozzle 29a and the funnel 41, and, since the trough 46 is open at the top, it is vented to the atmosphere. This construction provides a vacuum breaker in the liquid supply line to the receptacle 17 in which the liquid passing through the air gap 47 will be at atmospheric pressure.

The bottom 45a and three-sided wall 45 are formed to provide a ridge or vertical wall 45b intermediate the ends of the trough 46. The ridge 45b is formed by a semi-circular portion 45c of the bottom 45a of the trough 46 and defines a tunnel or passage through which extends the upper horizontal section of the flexible conduit 34. The vertical wall 45b functions as a dam to direct all of the liquid from the nozzle 29a of the solenoid valve 29 to the funnel 41. In the event liquid being supplied to the receptacle 17 through the conduit 27 cannot freely flow therein, the liquid level will rise in the trough 46; and, when the liquid level rises sufficiently at the end of the three-sided member 45 formed with the funnel 41, it will pass over the top of the dam or ridge 45b and flow into a tubular fitting 48 which depends from the bottom 45a of the member 45 and to which the upper end of the flexible conduit section 32' is connected. Liquid flowing downward in conduit 32' flows through conduit 33 to the inlet of the drain pump 31 and is discharged therefrom through conduits 34 and 44 to waste.

As shown in FIGS. 3 and 4, the panel 36 is provided with an opening 49 which is at the side of the dam or ridge 45b at the vicinity of the tubular fitting 48 to which the upper end of the flexible conduit 32' is connected. The bottom of the opening 49 is at a higher level than the bottom 45a of the three-sided member 45. In the event the drain pump 31 does not function to drain water from the bottom of the receptacle 17, liquid will overflow through the opening 49 and prevent liquid accumulating in the receptacle 17 and flooding the washing machine 10.

The panel 36 is formed with an opening 50 through which the electrical cord 35 passes from the outer face or sides to the inner face or side of the panel. To the inner face of the panel 36 is fixed a member 51 having a semicircular part 51a provided with outwardly extending arms 51b. The cord 35 rests on the semi-circular part 51a and is tightly held in position by a cross bar 52 which is removably secured at 52a to the arms 51b. It will be understood that the parts just described rigidly hold the electrical cord 35 and function as a strain-relief device so that any pull exerted on the electrical cord 35 outside the shell 11 will not be transmitted and carried to a part of the electrical circuit to which the electrical wires of the cord are connected.

It will now be understood that the assembly 26 provides a panel 36 to which the electrical and liquid connections are made. This facilitates inspection and repairing of the washing machine when the panel 36 is removed from the rear wall 12. Further, the assembly 26 is constructed to form a vacuum breaker which is a unitary part thereof.

Although I have shown and described a single embodiment of the invention, I do not wish to be limited to the particular arrangement set forth. Thus, it will be understood that the invention can be employed equally well in a household dishwashing machine as well as in a washing machine. Therefore, I intend in the following claims to cover all modifications which do not depart from the spirit and scope of my invention.

I claim:
1. In a household washing appliance comprising a receptacle for items to be washed, the combination of
 a liquid supply line for introducing liquid to the receptacle,
 a drain pump having an inlet connected by a first conduit to receive liquid from the receptacle and an outlet from which liquid is discharged through a liquid discharge line to waste,
 an assembly comprising a panel,
 means for removably mounting said assembly on the appliance,
 said panel having a first opening extending therethrough and a first fitting communicating with the opening and extending from the outer surface or face thereof, said liquid supply line including a first conduit connected to said first fitting,
 the inner face or surface of said panel having structure fixed thereto which provides a path for flow of liquid and is in communication with the first opening, said structure having a discharge orifice at a first level which is directed to discharge downward therefrom,
 means at the inner face or surface of said panel which provides a trough having a bottom and an open top at a second level below the first level and into which liquid is discharged from the discharge orifice,
 the bottom of said trough having a first downward extending hollow element, said liquid supply line including a second conduit having an end connected to said hollow element,
 the bottom of said trough having a second downward extending hollow element, and a third conduit connected at one end to said second hollow element and at its other end to the inlet of said drain pump, said third conduit providing an alternative path of flow for liquid unable to flow to the appliance through said second conduit.

2. Apparatus as set forth in claim 1 in which said panel is formed with a second opening through which liquid from said drain pump can flow, the bottom of said last-mentioned second opening being at a level above the level of the bottom of said trough.

3. Apparatus as set forth in claim 1 in which said panel is formed with another opening and a second fitting communicating with the last-mentioned other opening and extending from the outer surface or face thereof, the liquid discharge line including a fourth conduit having one end connected to receive liquid from the outlet of said drain pump and its other end communicating with the other opening, said fitting being adapted to receive a conduit for conducting to waste liquid discharged from the receptacle by said drain pump.

4. Apparatus as set forth in claim 3 in which said means at the inner face or surface of said panel providing said open top trough includes a side wall and the bottom, the bottom and side wall of said trough being indented at the underside thereof to form a passage which receives and through which said fourth conduit extends.

5. Apparatus as set forth in claim 1 in which said panel is formed with another opening, and an electrical cord having one end adapted to be connected to a source of electrical supply, said electrical cord extending through said other opening from the outer face or surface of said panel to the inner face or surface thereof.

6. Apparatus as set forth in claim 5 which includes means fixed to the inner face or surface of said panel at the vicinity of the other opening therein, said last-mentioned means including structure coacting with said cord to provide a strain-relief connection therefor.

7. Apparatus as set forth in claim 1 in which said structure at the inner face or surface of said panel includes a valve for controlling flow of liquid in said liquid supply line.

8. Apparatus as set forth in claim 1 in which said structure at the inner face or surface of said panel includes a solenoid operated valve.

9. Apparatus as set forth in claim 1 in which said panel coacts with said means at the inner surface or face of said panel to provide said open top trough.

10. Apparatus as set forth in claim 1 in which said appliance comprises an outer shell having upright side walls and a top, one of said side walls having an opening, and means for removably mounting said panel on said one side wall at the last-mentioned opening.

No references cited

WILLIAM F. O'DEA, *Primary Examiner.*

D. LAMBERT, *Assistant Examiner.*